July 27, 1926.  
H. J. ENGEL  
1,594,249  
MEASURING AND FILLING DEVICE  
Filed Nov. 30, 1925
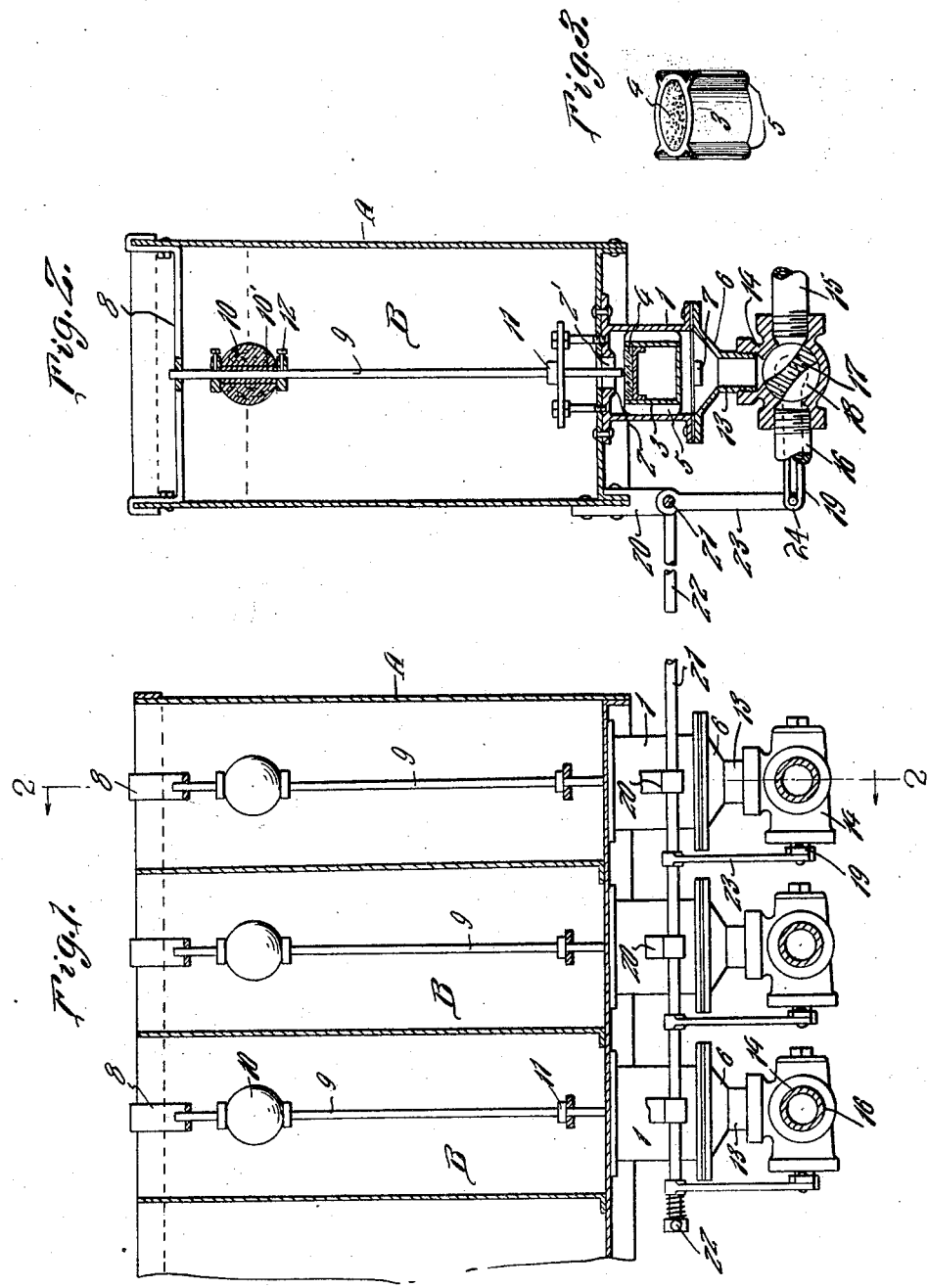
Henry J. Engel  
INVENTOR  
BY Victor J. Evans  
ATTORNEY
WITNESS:

Patented July 27, 1926.

1,594,249

UNITED STATES PATENT OFFICE.

HENRY J. ENGEL, OF BRONX, NEW YORK.

MEASURING AND FILLING DEVICE.

Application filed November 30, 1925. Serial No. 72,260.

This invention relates to improvements in measuring and filling devices and has for its primary object, the provision of a means for automatically shutting off the flow of liquid to a tank when the liquid therein reaches a predetermined level.

The type of measuring and filling tanks now in use depend on a so-called float valve to obtain the correct level and quantity of liquid in a tank. The float valve adjusted for a particular level will keep the same constant only if the pressure of the liquid supply is constant. As soon as the pressure goes below the pressure at which the float valve was adjusted, the liquid level in the tank will be lower as the float of the float valve will close the valve tight against its seat sooner and vice versa. A number of patentees have tried to overcome this deficiency of the float valve by providing overflows, overflowing chambers or double float valves, one to regulate the level and the other to regulate the pressure. However, all of them either involve a loss of liquid or are so complicated that they are not dependable. My invention is designed to overcome these objections, as the liquid level once determined in the tank will always remain the same regardless of any change in pressure under which the liquid is delivered to the measuring tank.

Another object of the invention resides in a measuring and filling device which is simple in construction, inexpensive of manufacture and highly efficient for the purpose intended.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a sectional elevational view of a plurality of tanks or compartments showing my invention in connection therewith.

Figure 2 is a vertical sectional view on the line 2—2 of Figure 1.

Figure 3 is a detail perspective view of the buoyant float valve.

Referring more particularly to the drawing, the reference character A designates a structure divided into a plurality of tanks or compartments B, or the structure may be composed of a plurality of separate tanks without in any way departing from the spirit of my invention.

Depending from the bottom of each tank B is a casing or chamber 1 having communication with the tank B through a passage way or opening 2'. The top of the casing which surrounds the opening is formed to provide a valve seat 2, and vertically movable within the casing is a float valve or buoyant member 3 provided with a valve disk 4 for co-action with the seat 2. The sides of the float valve are provided with spaced radially arranged fins 5 for keeping the walls of the float valve in spaced relation with the inner vertical walls of the casing, and to guide the same in its vertical movement whereby liquid may pass between the float valve in the walls of the casing without choking the flow. The casing or chamber is provided with a lower section 6 bolted or otherwise secured to the casing and in which is provided an inwardly projecting lug 7 for preventing the float valve from seating against the lower walls when a liquid is being discharged from the tank.

Mounted within each tank B adjacent the top and bottom thereof, are brackets 8 which act as guides or bearings for a slidable float rod 9 having a globular float 10 adjustably mounted thereon. A collar 11 is formed on the rod adjacent its lower end for limiting the movement of the lower end of the rod which extends through the passage 2', and normally prevents the float valve from co-acting with the seat 2 to allow a liquid under pressure to freely pass from the chamber to the tank B. The float 10 has an opening passing therethrough in which is mounted a light ferrule 10' which is fixedly mounted in the walls of the opening and serves as a bearing which may be removed and replaced when worn. The float 10 carries collars from which set screws 12 pass for clamping the float in an adjusted position upon the rod for regulating the desired liquid level at which the device is adapted to operate for shutting off the flow of liquid from the chamber 1 to the tank B. It might be mentioned that the float 10 and the rod 9 combined are of such weight as to overcome the buoyancy of the float valve 3, as it is not necessary for the same to exert any other pressure as in the ordinary type of float valve.

The lower section 6 above referred to is provided with a threaded nipple 13 to which a three way valve 14 is connected. A liquid supply pipe 15 connects with one side of the valve 14 while a discharge pipe 16 connects with the opposite side, and interposed between the inlet and the discharge pipes is a rotatable plug 17 with the usual passage ways 18 therein for establishing and disestablishing communication between the supply pipe and the chamber, between the outlet or discharge pipe and the chamber and for completely shutting off communication between both the inlet and discharge pipes and the chamber. Connected with each plug 17 is a lever 19 and journalled in bearings 20 carried by the structure A is a rocker shaft 21 having an operating arm or handle 22 fixedly connected at one end thereof. Each lever 19 of the respective valves is operatively connected with the rocker shaft 21, by means of an arm 23 fixed to the rocker shaft and joined with the lever 19 by a pin and slot connection 24. By actuating the handle 21, movement may be imparted to all of the valves simultaneously for obtaining a correct setting of the valve plugs.

In operation, the three way valve 14 is set to connect the liquid supply with the chamber 1, at which time the discharge pipe is closed. The float 10 and rod 9 are at their lowest position, therefore holding the float valve 3 off the seat 2 to allow the incoming liquid to pass about the valve 3 into the measuring tank B until the level of the liquid in the tank reaches the float 10. As the float 10 rises, it moves the rod away from the float valve 3 until the said valve co-acts with its seat 2 at which time the flow to the tank is automatically shut off. As the float valve nears its seat the incoming liquid is gradually choked which creates a pressure against the float valve for positively seating the same, so that no liquid may pass to the tank B. When the rocker shaft is actuated to move the plug to a position for closing communication between the liquid supply and the chamber, and for establishing communication between the chamber and the outlet, the liquid pressure in the chamber is released as the liquid will be discharged which causes the float valve to automatically drop from its seat whereupon the static head of liquid in the tank is free to pass out until the tank is entirely empty, at which time the valve may be reset for filling purposes.

While I have described what I deem to be the most desirable embodiment of my invention, it is obvious that many of the details may be varied without in any way departing from the spirit of my invention, and I therefore do not limit myself to the exact details of construction nor to anything less than the whole of my invention limited only by the appended claims.

What is claimed as new is:—

1. In a liquid measuring device, the combination of a tank, a chamber, a passage connecting said tank and chamber, a float valve movable within said chamber, and a buoyant element within said tank movable independently of said float valve, and engageable therewith for holding said float valve out of closing position with said passage for permitting a liquid under pressure to pass through said chamber and into said tank, and for automatically releasing said float valve by the raising of said buoyant element when the level of liquid in said tank reaches a predetermined level for allowing said float valve to close said passage.

2. In a liquid measuring device, the combination of a tank, a chamber, a passage connecting said tank and chamber, a float valve movable within said chamber, and means for holding said float valve out of closing position with said passage for permitting a liquid under pressure to pass through said chamber and into said tank, and for automatically releasing said float valve when the level of liquid in said tank reaches a predetermined level for allowing said float valve to close said passage, said means including a rod independently movable with respect to said float valve slidably mounted within said tank and normally engaging said float valve, and a float carried by said rod and disposed within said tank.

3. In a liquid measuring device, the combination of a tank, a chamber, a passage connecting said tank and chamber, a float valve movable within said chamber, and means for holding said float valve out of closing position with said passage for permitting a liquid under pressure to pass through said chamber and into said tank, and for automatically releasing said float valve when the level of liquid in said tank reaches a predetermined level for allowing said float valve to close said passage, said means including a rod independently movable with respect to said float valve and slidably mounted within said tank and normally engaging said float valve, and a float adjustably mounted upon said rod within said tank for regulating the level of liquid in said tank at which said rod will operate to release said float valve.

4. In a liquid measuring device, the combination of a tank, a chamber, a passage for establishing communication between said tank and said chamber, a buoyant valve member vertically movable within said chamber, means for normally holding said buoyant member in spaced relation with the walls of said chamber for permitting a liquid to pass therebetween, and means operable independently of said buoyant valve member for holding said buoyant valve member out of closing engagement with said passage to allow liquid under pressure to pass from said chamber into said tank, and for automatically releasing said buoyant valve member when the level of liquid in said tank reaches a predetermined level whereby said buoyant valve member will automatically close said passage.

5. In a liquid measuring device, the combination of a tank, a chamber, a passage for establishing communication between said tank and said chamber, a buoyant valve member vertically movable within said chamber, means for normally holding said buoyant member in spaced relation with the walls of said chamber for permitting a liquid to pass therebetween, and means operable independently of said buoyant valve member for holding said buoyant valve member out of closing engagement with said passage to allow liquid under pressure to pass from said chamber into said tank, and for automatically releasing said buoyant valve member when the level of liquid in said tank reaches a predetermined level whereby said buoyant valve member will automatically close said passage, and manually operable means for controlling the flow of liquid to and from said chamber.

6. In a liquid measuring device, a tank, a chamber, a passage for establishing communication between said tank and said chamber, a valve seat, a buoyant valve member within said chamber, means for normally holding said buoyant member in spaced relation with the walls of said chamber for permitting a liquid to freely pass therebetween when said buoyant valve member is off said seat, and means operable independently of said buoyant valve member for holding said buoyant valve member off said seat during the passage of liquid under pressure from said chamber to said tank during the filling of said tank and from said tank to said chamber upon the discharge of liquid from said tank until the level of liquid in said tank reaches a predetermined level at which time said buoyant valve member automatically co-acts with said valve seat to close said passage.

7. In a liquid measuring device, the combination of a tank adapted to receive a liquid under pressure, a chamber disposed beneath said tank, a passage for establishing communication between said tank and said chamber, a float valve freely movable within said chamber, a rod slidably mounted within said tank and a buoyant element operable independently of said float valve and mounted on said rod and responsive to the level of the liquid in said tank, said rod extending through said passage and engageable with said float valve.

In testimony whereof I have affixed my signature.

HENRY J. ENGEL.